(12) United States Patent
Baek

(10) Patent No.: US 8,974,926 B2
(45) Date of Patent: Mar. 10, 2015

(54) SECONDARY BATTERY

(75) Inventor: Woonseong Baek, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 829 days.

(21) Appl. No.: 13/156,223

(22) Filed: Jun. 8, 2011

(65) Prior Publication Data

US 2012/0129012 A1 May 24, 2012

(30) Foreign Application Priority Data

Nov. 19, 2010 (KR) ........................ 10-2010-0115492

(51) Int. Cl.
| | | |
|---|---|---|
| *H01M 14/00* | (2006.01) | |
| *H01M 2/00* | (2006.01) | |
| *H01M 2/02* | (2006.01) | |
| *H01M 10/42* | (2006.01) | |
| *H01M 2/04* | (2006.01) | |
| *H01M 2/34* | (2006.01) | |

(52) U.S. Cl.
CPC ........ *H01M 10/4257* (2013.01); *H01M 2/0217* (2013.01); *H01M 2/0267* (2013.01); *H01M 2/04* (2013.01); *H01M 2/34* (2013.01)
USPC ................ 429/7; 429/163; 429/177; 429/178

(58) Field of Classification Search
CPC ................................ H01M 2/02; H01M 10/42
USPC ....................... 429/7, 163, 177, 178
See application file for complete search history.

(56) References Cited

U.S. PATENT DOCUMENTS

| | | | |
|---|---|---|---|
| 6,682,846 B2* | 1/2004 | Matsuoka et al. | 429/53 |
| 2006/0251930 A1* | 11/2006 | Kim | 429/7 |

(Continued)

FOREIGN PATENT DOCUMENTS

| | | |
|---|---|---|
| JP | 2003-100271 | 4/2003 |
| JP | 2005-517274 A | 6/2005 |

(Continued)

OTHER PUBLICATIONS

Korean Notice of Allowance dated Oct. 31, 2012 for Korean Patent Application No. KR 10-2010-0115492 which corresponds to captioned U.S. Appl. No. 13/156,223.

(Continued)

*Primary Examiner* — Helen O Conley
(74) *Attorney, Agent, or Firm* — Knobbe Martens Olson & Bear LLP

(57) ABSTRACT

Provided is a secondary battery in which an insertion hole where an electrode terminal is insertable is defined in a center of a bottom case disposed under a can to connect batteries to each other in series. The secondary battery includes an electrode assembly including a positive electrode tab and a negative electrode tab, a can in which the electrode assembly is received, an insulation case inserted into a top opening of the can, the insulation case having a first hole and a second hole through which the positive electrode tab and the negative electrode tab pass, a protective circuit module disposed on the insulation case, the protective circuit module being electrically connected to the positive electrode tab and the negative electrode tab, and a cap assembly including a cap plate disposed on the protective circuit module to close the top opening of the can, the cap plate being electrically connected to the protective circuit module and an electrode terminal inserted into a through hole defined in the cap plate.

17 Claims, 4 Drawing Sheets

(56) References Cited

U.S. PATENT DOCUMENTS

2008/0254344 A1 10/2008 Wang et al.
2009/0085518 A1* 4/2009 Hong et al. .................. 320/134
2009/0155684 A1* 6/2009 Jang et al. .................... 429/178

FOREIGN PATENT DOCUMENTS

| JP | 2007-048668 | 2/2007 |
| KR | 10-2002-0020695 A | 3/2002 |
| KR | 10 2004 0103940 | 12/2004 |
| KR | 10 2006 0035631 | 4/2006 |
| KR | 2009-0026643 | 3/2009 |
| WO | WO 2004/114452 A1 | 12/2004 |

OTHER PUBLICATIONS

Office Action dated Mar. 19, 2012 for corresponding KR Application No. 10-2010-0115492.

* cited by examiner

SECONDARY BATTERY

CROSS-REFERENCE TO RELATED APPLICATIONS

This application claims priority to Korean Patent Application No. 10-2010-0115492 filed on Nov. 19, 2010, in the Korean Intellectual Property Office, and entitled: "SECONDARY BATTERY" which is incorporated by reference herein in its entirety.

BACKGROUND

1. Field

Embodiments relate to a secondary battery.

2. Description of the Related Art

In a secondary battery, an electrode assembly including a positive electrode plate, a negative electrode plate, and a separator is positioned into a can formed of a metal material. An electrolyte is also injected into the can to seal the inside of the can. A secondary battery generally includes an electrode terminal electrically insulated from a can on an upper side thereof. The electrode terminal becomes one pole of the battery, and the can itself becomes the other pole.

Battery safety devices such as a secondary protection device, for example, a positive temperature coefficient (PTC) device, and a protective circuit module are connected to the sealed secondary battery to form a battery pack. Here, the safety devices are respectively connected to a positive electrode and a negative electrode to stop current flow when the voltage of the battery is suddenly increased due to overheat or over-charge/over-discharge of the battery, thereby reducing the risk of the battery exploding.

As the usage of mobile devices is increasing, there is an increasing need to improve the capacity of the battery without significantly increasing its size.

SUMMARY

An aspect of the present invention provides a secondary battery, which is connected to an adjacent battery in series to secure greater capacity in substantially the same volume.

According to at least one embodiment, a secondary battery includes: an electrode assembly including a positive electrode tab and a negative electrode tab; a can in which the electrode assembly is received; an insulation case inserted into a top opening of the can, the insulation case having a first hole and a second hole through which the positive electrode tab and the negative electrode tab pass; a protective circuit module disposed on the insulation case, the protective circuit module being electrically connected to the positive electrode tab and the negative electrode tab; and a cap assembly including a cap plate disposed on the protective circuit module to close the top opening of the can, the cap plate being electrically connected to the protective circuit module and an electrode terminal inserted into a through hole defined in the cap plate.

The secondary battery may further include a bottom cover under the can, wherein the bottom cover has an insertion hole having a shape corresponding to that of the electrode terminal.

Also, a bottom surface of the can may have a polarity opposite to that of the electrode terminal, and a protrusion may be disposed on a bottom surface of the can. Also, the protrusion may have a shape corresponding to that of the insertion hole of the bottom cover, and the protrusion may have a length less than a depth of the insertion hole.

Also, an insulative label may be attached to a side surface of the can.

Also, the protective circuit module may include a protective circuit board on which a protective circuit device is mounted and a secondary protection device, wherein the protective circuit board may include a first conductive plate connected to the positive electrode tab, and the secondary protection device may include a second conductive plate connected to the negative electrode tab. Here, the protective circuit board may further include a first positive electrode pad electrically connected to the first conductive plate and a negative electrode pad electrically connected to the secondary protection device. Also, the cap plate may include a second positive electrode pad on a bottom surface of one end thereof, wherein the second positive electrode pad may be electrically connected to the first positive electrode pad, and the electrode terminal may be electrically connected to the negative electrode pad.

Also, the bottom cover may be coupled to the can by resin molding. Also, the secondary battery may further include a top cover on the cap assembly, the top cover having a terminal hole having a size and shape corresponding to those of the electrode terminal, wherein the top cover and the bottom cover may be manufactured together with an entire outer surface by resin molding at the same time.

According to another embodiment, a secondary battery includes: an electrode assembly including a positive electrode tab and a negative electrode tab; a can receiving the electrode assembly; a cap assembly including a cap plate closing a top opening of the can and an electrode terminal inserted into a through hole defined in the cap plate; and a bottom cover disposed under the can, the bottom cover having an insertion hole with a size and shape corresponding to those of the electrode terminal.

Also, a bottom surface of the can may have a polarity opposite to that of the electrode terminal, and a protrusion may be disposed on a bottom surface of the can. Also, the protrusion may have a size and shape corresponding to those of the insertion hole of the bottom cover. Also, the protrusion may have a length less than a depth of the insertion hole.

Also, an insulative label may be attached to a side surface of the can.

Also, the bottom cover may be coupled to the can by resin molding. Also, the secondary battery may further include a top cover on the cap assembly, the top cover having a terminal hole with a size and shape corresponding to those of the electrode terminal, wherein the top cover and the bottom cover may be manufactured together with an entire outer surface by resin molding at the same time.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
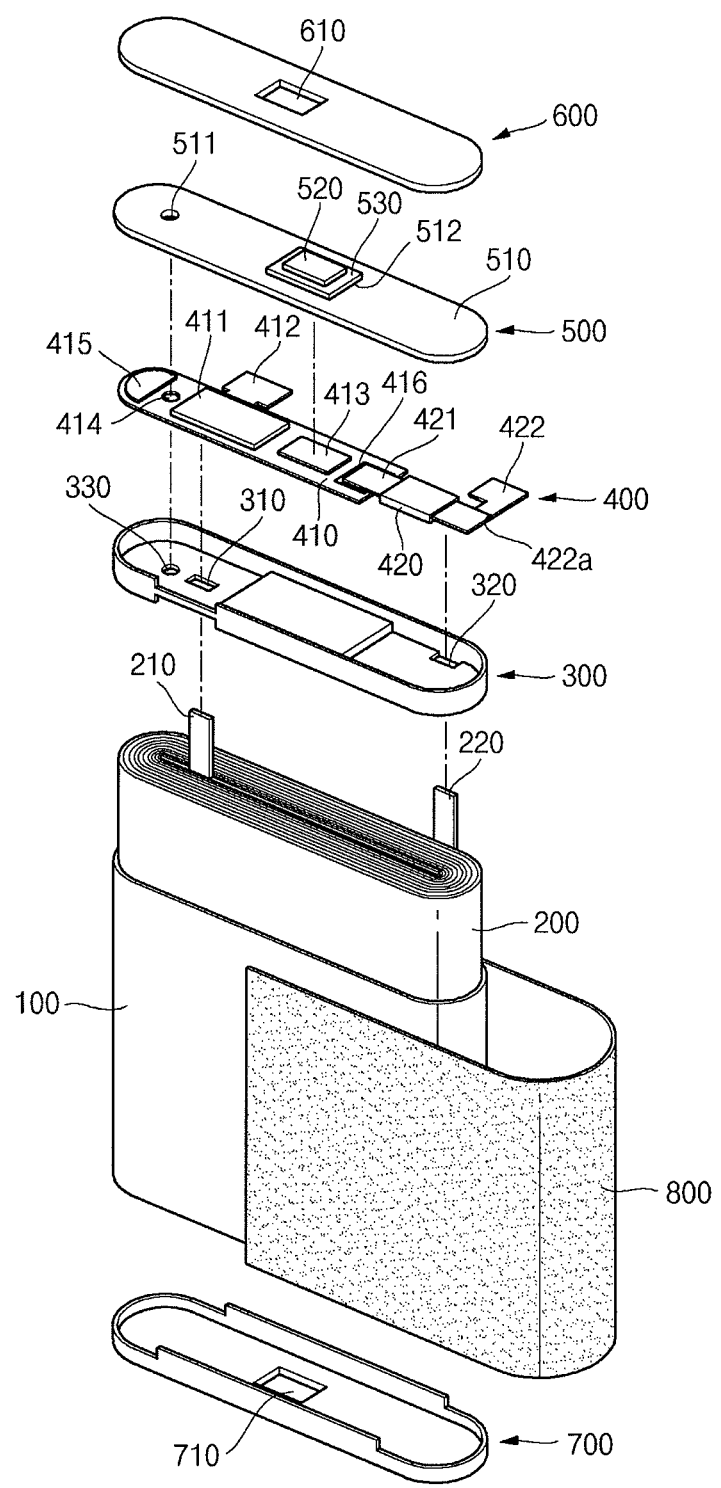
FIG. 1 is an exploded perspective view of a secondary battery according to an embodiment.
Figure 2:
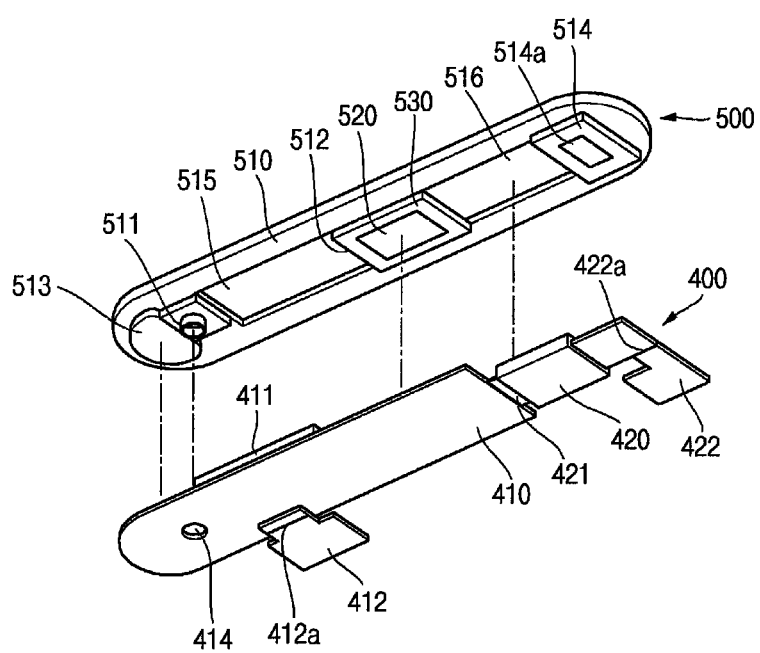
FIG. 2 is a perspective view illustrating bottom surfaces of a protective circuit module and a cap assembly of the secondary battery according to an embodiment.

FIG. 1 is an exploded perspective view of a secondary battery according to an embodiment, and FIG. 2 is a perspective view illustrating bottom surfaces of a protective circuit module and a cap assembly of the secondary battery according to an embodiment.

Referring to FIG. 1, a secondary battery according to an embodiment includes a can 100, an electrode assembly 200 received into the can 100, an insulation case 300 inserted into a top opening of the can 100, a protective circuit module 400 disposed on the insulation case 300, a cap assembly 500 disposed on the protective circuit module 400 and electrically insulated from the protective circuit module 400, a top cover 600 disposed on the cap assembly 500 and having a terminal hole 610, and a bottom cover 700 disposed under the can 100 and having an insertion hole 710 at a center thereof.

The electrode assembly 200 includes a positive electrode plate (not shown), a negative electrode plate (not shown), and a separator (not shown). The separator is disposed between the positive electrode plate and the negative electrode plate. The positive electrode plate, the separator, and the negative electrode plate may be sequentially stacked, and then wound in a jelly-roll type manner. A positive electrode tab 210 is welded to the positive electrode plate. The positive electrode tab 210 has one end protruding upward from the electrode assembly 200. A negative electrode tab 220 is welded to the negative electrode tab. The negative electrode tab 220 has one end protruding upward from the electrode assembly 200.

It will be understood by those of ordinary skill in the art that the positive electrode tab 220 and the negative electrode tab 210 have polarities changed with each other according to positions through which the electrode tabs protrudes.

The can 100 may be formed of a metal material having an approximately rectangular parallelepiped shape. Also, the can 100 itself may serve as a terminal and usually has a polarity opposite to that of the electrode terminal 520. Since the can 100 itself has a polarity, a label or wrapper 800 formed of an insulating material may be attached to the entire side surface of the can 100 to insulate the side surface of the can 100 from the outside. In this case, a bottom surface of the can 100 may serve as another electrode terminal having a polarity opposite to that of the electrode terminal 520 disposed on the cap assembly 500. A top end of the can 100 is opened to form the top opening. The electrode assembly 200 is received through the top opening of the can 100.

The insulation case 300 has a size and shape corresponding to those of the top opening of the can 100 and is inserted into the top opening. The insulation case 300 includes a positive electrode tab hole 310 through which the positive electrode tab 210 protruding from the electrode assembly 200 passes and a negative electrode tab hole 320 through which the negative electrode tab 220 passes. Also, the insulation case 300 includes a second electrolyte hole 330 at a position corresponding to that of an electrolyte injection port 511 passing through the cap plate 510 constituting the cap assembly 500. The insulation case 300 insulates the electrode assembly 200 from the protective circuit module 400. Thus, the insulation case 300 is formed of an electrical insulating material.

The protective circuit module 400 is coupled to an upper portion of the insulation case 300. The protective circuit module 400 is disposed in a space between the top opening of the can 100 and the insulation case 300. The protective circuit module 400 includes a protective circuit board 410 on which a protective circuit device 411 is mounted and a secondary protection device 420. The protective circuit board 410 and the secondary protection device 420 are welded and coupled to a first connection terminal 416 disposed on the other end of the protective circuit board 410 and a second connection terminal 421 disposed on one end of the secondary protection device 420.

A wiring pattern (not shown) is mounted on the protective circuit board 410. Also, the protective circuit device 411 electrically connected to the wiring pattern is disposed on a top surface of the protective circuit board 410. The protective circuit device 411 may control the charging/discharging operation of the secondary battery.

A first conductive plate 412 electrically connected to the positive electrode tab 210 and the wiring pattern is disposed on a bottom surface of the protective circuit board 410. The first conductive plate 412 includes a first bent part 412a so that it is bent toward the insulation case 300. The first conductive plate 412 is bent from the first bent part 412a toward the insulation case 300 and is welded to the positive electrode tab 210. Thus, the first conductive plate 412 is electrically connected to a positive electrode of the electrode assembly 200.

A negative electrode pad 413 disposed between the protective circuit device 411 and the first connection terminal 416 is disposed on a top surface of the protective circuit board 410. The negative electrode pad 413 is electrically connected to the wiring pattern and allows the electrode terminal 520 constituting the cap assembly 500 to be electrically connected to the protective circuit board 410.

A first positive electrode pad 415 is disposed on a top surface of the other end of the protective circuit board 410. Since the first positive electrode pad 415 is electrically connected to the wiring pattern, the first positive electrode pad 415 is electrically connected to the protective circuit device 411 and the first conductive plate 412. Also, the first positive electrode pad 415 is electrically connected to a second positive electrode pad 513 disposed on a bottom surface of the cap assembly 500 that will be described later.

A first electrolyte hole 414 defined between the first positive electrode pad 415 and the protective circuit device 411 is defined in the top surface of the protective circuit board 410. The first electrolyte hole 414 is defined in a position corresponding to that of the second electrolyte hole 330 defined in the insulation case 300. The first electrolyte hole 414 has a size and shape corresponding to those of the second electrolyte hole 330. A protruding portion of the electrolyte injection port 511 defined in the cap assembly 500 (that will be described later) is inserted into the first electrolyte hole 414.

The second connection terminal 421 is disposed on one end of the secondary protection device 420, and a second conductive plate 422 is disposed on the other end of the secondary protection device 420. The secondary protection device 420 inhibits an overcurrent from flowing into a circuit to protect the secondary battery. A thermal fuse, a positive temperature coefficient (PTC) device, or a bimetal may be used as the secondary protection device 420.

As described above, since the second connection terminal 421 is welded to the first connection terminal 416, the secondary protection device 420 is electrically connected to the protective circuit board 410. Also, since the second conductive plate 422 is connected to the negative electrode tab 220, the secondary protection device 420 is electrically connected to a negative electrode of the electrode assembly 200. The second conductive plate 422 includes a second bent part 422a so that it is bent toward the insulation case 300. The second conductive plate 422 is bent from the second bent part 422a toward the insulation case 300 and is welded to the negative electrode tab 220. Thus, the second conductive plate 422 is electrically connected to the negative electrode of the electrode assembly 200.

The cap assembly 500 includes the cap plate 510, the electrode terminal 520 inserted into a through hole 512 passing through a center of the cap plate 510, and an insulation gasket 530 disposed between the cap plate 510 and the electrode terminal 520.

The cap plate 510 may be formed of a metal plate having a size and shape corresponding to those of the top opening and the insulation case 300. Also, the cap plate 510 is coupled to the protective circuit module 400 to close the top opening of the can 200.

The cap plate 510 includes the electrolyte injection port 511. The electrolyte injection port 511 passes through the cap plate 510, is defined in a position corresponding to those of the first electrolyte hole 414 and the second electrolyte hole 330, and has a size and shape corresponding to those of the electrolyte hole 414 and the second electrolyte hole 330. The electrolyte injection port 511 protrudes toward a bottom surface of the cap plate 510 and is inserted into the first electrolyte hole 414 and the second electrolyte hole 330. Thus, the electrolyte injection port 511 guides the electrolyte to the inside of the can 100 by preventing the electrolyte leaking between the cap plate 510 and the insulation case 300 when the electrolyte is injected.

The electrode terminal 520 is inserted into the through hole 512 passing through the center of the cap plate 510. The insulation gasket 530 is disposed between the electrode terminal 520 and the cap plate 510 to electrically insulate the electrode terminal 520 from the cap plate 510.

The electrode terminal 520 is electrically connected to the negative electrode pad 413 disposed on the protective circuit board 410. Since the electrode terminal 520 and the negative electrode pad 413 are welded to each other, the electrode terminal 520 is electrically connected to the negative electrode of the electrode assembly 200. That is, the negative electrode tab 220 is electrically connected to the second conductive plate 422, and the second conductive plate 422 is electrically connected to the secondary protection device 420. Also, the secondary protection device 420 is electrically connected to the second connection terminal 421, and the second connection terminal 421 is electrically connected to the first connection terminal 416. Also, the first connection terminal 416 is electrically connected to the negative electrode pad 413 through the wiring pattern, and the negative electrode pad 413 is directly coupled to the electrode terminal 520.

The insulation gasket 530 is disposed between the cap plate 510 and the electrode terminal 520, which have polarities different from each other to prevent the cap plate 510 and the electrode terminal 520 from being electrically short-circuited with each other.

A second positive electrode pad 513 is disposed on a bottom surface of one end of the cap plate 510. The second positive electrode pad 513 is disposed at a position corresponding to that of the first positive electrode pad 415 disposed on the protective circuit board 410. The second positive electrode pad 513 is formed of a conductive material and electrically connected to the cap plate 510. Since the second positive electrode pad 513 is coupled to the first positive electrode pad 415 by welding, the positive electrode of the electrode assembly 200 is electrically connected to the cap plate 510. That is, the positive electrode tab 210 is electrically connected to the first conductive plate 412, and the first conductive plate 412 is electrically connected to the protective circuit device 411 by the wiring pattern mounted on the protective circuit board 410. Also, the protective circuit device 411 is electrically connected to the first positive electrode pad 415 by the wiring pattern, and the first positive electrode pad 415 is electrically connected to the second positive electrode pad 513.

A support 514 for supporting the second conductive plate 422 is disposed on a bottom surface of the other end of the cap plate 510. The support 514 is formed of an insulating material to prevent the second conductive plate 422 and the cap plate 510 from being short-circuited with each other. Also, a welding pad 514a is disposed on the support 514. The welding pad 514a is welded and coupled to a portion at which the second conductive plate 422 is not bent from the second bent part 422a.

A first receiving groove 515 disposed between the electrolyte injection port 511 and the insulation gasket 530 is defined in the bottom surface of the cap plate 510. The first receiving groove 515 is defined in a position corresponding to that of the protective circuit device 411 disposed on the protective circuit board 410. Also, the first receiving groove 515 has a shape and size corresponding to those of the protective circuit device 411. Also, a second receiving groove 516 disposed between the insulation gasket 530 and the support 514 is defined in the bottom surface of the cap plate 510. The second receiving groove 516 is defined in a position corresponding to that of the secondary protection device 420. Also, the second receiving groove 516 has a shape and size corresponding to those of the secondary protection device 420. Thus, when the protective circuit module 400 and the cap assembly 500 are coupled to each other, the protective circuit module 400 and the cap assembly 500 are closely coupled to each other to reduce the total volume of the secondary battery.

The top cover 600 is coupled to an upper portion of the cap assembly 500 and has a size and shape corresponding to those of the opening of the can 100. The top cover 600 has a terminal hole 610 having a size and shape corresponding to those of the electrode terminal 520 in a center thereof.

The bottom cover 700 is disposed under the can 100. An insertion hole 710 having a size and shape corresponding to those of the electrode terminal 520 is defined in a center of the bottom cover 700. Since the electrode terminal 520 of another secondary battery having the same or similar configuration as the battery described above is inserted into the insertion hole 710 defined in the bottom cover 700 of one secondary battery, the secondary batteries may be connected to each other in parallel. In this case, the electrode terminal 520 of the other secondary battery should contact the bottom surface of the can 100 having a polarity opposite to that of the electrode terminal 520 of the first secondary battery.

A resin molding may be performed on a portion at which the top cover 600 and the bottom cover 700 contact the can 100 to couple the top cover 600 and the bottom cover 700 to the can. Alternatively the resin molding can be performed on the entire outer surfaces of the top cover, the bottom cover, and the can 100 to couple the top cover 600 and the bottom cover 700 to the can 100.

Hereinafter, a secondary battery according to another embodiment will be described.

Figure 3:
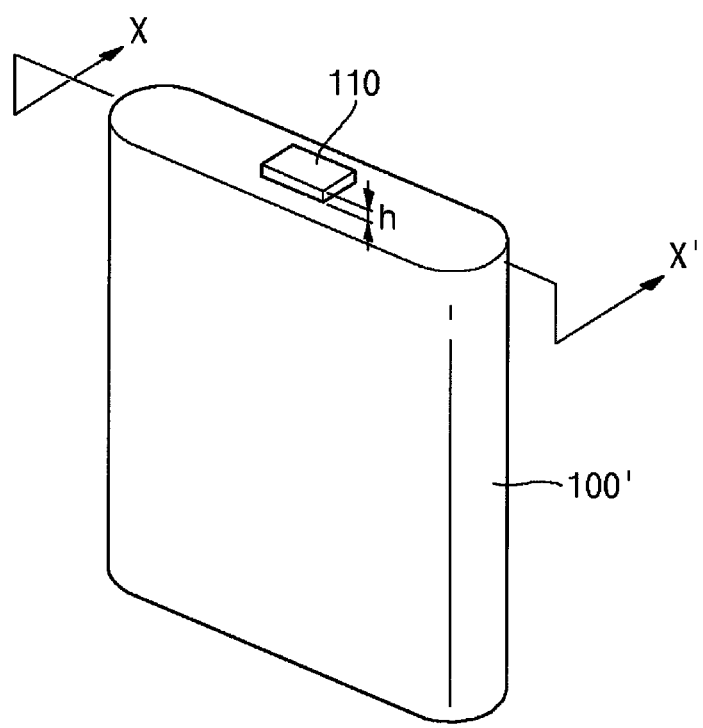
FIG. 3 is a perspective view of a protrusion disposed on a bottom surface of a can of a secondary battery according to another embodiment.

FIG. 3 is a perspective view of a protrusion disposed on a bottom surface of a can 100' of a secondary battery according to another embodiment.

Figure 4:
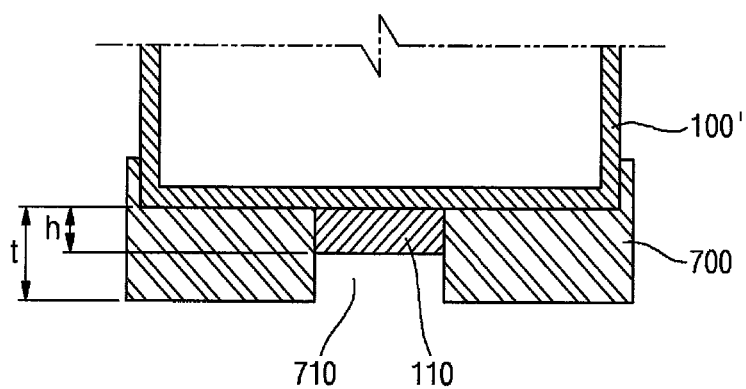
FIG. 4 is a sectional view taken along line X-X' of FIG. 3 in a state where a bottom cover is coupled to the bottom surface of the can on which the protrusion is disposed in the can of the secondary battery according to another embodiment.

FIG. 4 is a sectional view taken along line X-X' of FIG. 3 in a state where a bottom cover 700 is coupled to the bottom surface of the can 100' on which the protrusion is disposed in the can of the secondary battery according to another embodiment.

The secondary battery according to another embodiment includes the can 100' on which a protrusion 110 is disposed on a bottom surface thereof, an electrode assembly 200 received into the can 100', an insulation case 300 inserted into a top opening of the can 100', a protective circuit module 400 disposed on the insulation case 300, a cap assembly 500 disposed on the protective circuit module 400, a top cover 600 disposed on the cap assembly 500, and a bottom cover 700 disposed under the can 100' and having an insertion hole 710 having a size and shape corresponding to those of the electrode terminal 520 in a center thereof.

The secondary battery according to another embodiment has the same component and function as those of the secondary battery according to an embodiment described above except for a configuration of a bottom surface of the can 100'. Thus, duplicated descriptions with respect to the same components will be omitted, and only different points will be described.

Referring to FIG. 3, a protrusion 100 is disposed on the center of the bottom surface of the can 100' of the secondary battery according to another embodiment. The protrusion 110 is configured to easily contact a bottom surface of a can 100' of the other secondary battery having a polarity opposite to that of the electrode terminal 520 of one secondary battery when the batteries are connected to each other in series.

The protrusion 110 may be integrated with the can 100' in one body. Alternatively, a terminal formed of a conductive material is welded to the center of the bottom surface of the can 100' to attach the protrusion 110 to the can 100'. Also, to connect the batteries to each other in series, the protrusion 110 should have a size and shape capable of being inserted into the insertion hole 710 and have a length h equal to or less than a depth t of the insertion hole 710.

Thus, the protrusion 110 may have a size and shape corresponding to those of the insertion hole 710 and a length h equal to or less than a half of a depth t of the insertion hole 710. This is done so that the batteries are firmly coupled to each other when the batteries are connected to each other in series, and the electrode terminal 520 and the protrusion 110 securely contact each other.

In the secondary battery according to the embodiments, the battery packs are connected to each other in series to secure a large-capacity secondary battery.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
an electrode assembly comprising a positive electrode tab and a negative electrode tab;
a can in which the electrode assembly is received;
an insulation case inserted into a top opening of the can, the insulation case having a first hole and a second hole through which the positive electrode tab and the negative electrode tab pass;
a protective circuit module disposed on the insulation case, the protective circuit module being electrically connected to the positive electrode tab and the negative electrode tab;
a cap assembly comprising a cap plate disposed on the protective circuit module to close the top opening of the can, the cap plate being electrically connected to the protective circuit module and wherein the cap plate defines a through hole and wherein an electrode terminal having a first width, a first length a first height is inserted into the through hole; and
a bottom cover under the can, wherein the bottom cover has an insertion hole with a protrusion that extends outward from the bottom surface of the can within the opening so as to define an opening having a shape that has a first width, first length and first depth corresponding to length, width and height of the electrode terminal such that an electrode terminal of a secondary battery having the first width, first length and first height is positionable within the insertion hole so as to permit secondary batteries to be connected.

2. The secondary battery as claimed in claim 1, wherein a bottom surface of the can has a polarity opposite to that of the electrode terminal.

3. The secondary battery as claimed in claim 1, wherein a protrusion is disposed on a bottom surface of the can.

4. The secondary battery as claimed in claim 3, wherein the protrusion has a shape corresponding to that of the insertion hole of the bottom cover.

5. The secondary battery as claimed in claim 3, wherein the protrusion has a length less than a depth of the insertion hole.

6. The secondary battery as claimed in claim 1, wherein an insulative label is attached to a side surface of the can.

7. The secondary battery as claimed in claim 1, wherein the protective circuit module comprises a protective circuit board on which a protective circuit device is mounted and a secondary protection device, wherein the protective circuit board comprises a first conductive plate connected to the positive electrode tab, and the secondary protection device comprises a second conductive plate connected to the negative electrode tab.

8. The secondary battery as claimed in claim 7, wherein the protective circuit board further comprises a first positive electrode pad electrically connected to the first conductive plate and a negative electrode pad electrically connected to the secondary protection device.

9. The secondary battery as claimed in claim 8, wherein the cap plate comprises a second positive electrode pad on a bottom surface of one end thereof, wherein the second positive electrode pad is electrically connected to the first positive electrode pad, and the electrode terminal is electrically connected to the negative electrode pad.

10. A secondary battery comprising:
an electrode assembly comprising a positive electrode tab and a negative electrode tab;
a can receiving the electrode assembly;
a cap assembly comprising a cap plate closing a top opening of the can and an electrode terminal having a first height, a first width and a first length inserted into a through hole defined in the cap plate; and
a bottom cover disposed under the can, the bottom cover having an insertion hole and a protrusion that extends outward from the bottom of the can within the opening with a size and shape corresponding to those of the electrode terminal wherein the insertion hole with the protrusion define an opening having a shape that has a width, and first depth corresponding to that of the electrode terminal such that an electrode terminal of a secondary battery having the first width, first height and first length is positionable within the insertion hole so as to permit secondary batteries to be connected.

11. The secondary battery as claimed in claim 10, wherein a bottom surface of the can has a polarity opposite to that of the electrode terminal.

12. The secondary battery as claimed in claim 10, wherein a protrusion is disposed on a bottom surface of the can.

13. The secondary battery as claimed in claim 12, wherein the protrusion has a size and shape corresponding to those of the insertion hole of the bottom cover.

14. The secondary battery as claimed in claim 12, wherein the protrusion has a length less than a depth of the insertion hole.

15. The secondary battery as claimed in claim 10, wherein an insulative label is attached to a side surface of the can.

16. The secondary battery as claimed in claim 10, wherein the bottom cover is coupled to the can by resin molding.

17. The secondary battery as claimed in claim 10, further comprising a top cover on the cap assembly, the top cover having a terminal hole with a size and shape corresponding to those of the electrode terminal, wherein the top cover and the bottom cover are manufactured together with an entire outer surface by resin molding at the same time.

* * * * *